(12) United States Patent
Carraro et al.

(10) Patent No.: US 11,167,730 B2
(45) Date of Patent: Nov. 9, 2021

(54) END PIECE AND WIPER RUBBER OF A WIPER BLADE

(71) Applicant: Valeo Systèmes d'Essuyage, Le Mesnil Saint Denis (FR)

(72) Inventors: Philippe Carraro, Issoire (FR); Guillaume Barret, Issoire (FR); Xavier Bousset, Issoire (FR); Christophe Chassaing, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 133 days.

(21) Appl. No.: 16/497,210

(22) PCT Filed: Mar. 27, 2018

(86) PCT No.: PCT/EP2018/057830
§ 371 (c)(1),
(2) Date: Sep. 24, 2019

(87) PCT Pub. No.: WO2018/178109
PCT Pub. Date: Oct. 4, 2018

(65) Prior Publication Data
US 2020/0094787 A1    Mar. 26, 2020

(30) Foreign Application Priority Data

Mar. 27, 2017   (FR) ...................... 1752534

(51) Int. Cl.
*B60S 1/38*       (2006.01)
*B60S 1/52*       (2006.01)

(52) U.S. Cl.
CPC .......... *B60S 1/3887* (2013.01); *B60S 1/3879* (2013.01); *B60S 1/3891* (2013.01); *B60S 1/3894* (2013.01); *B60S 1/524* (2013.01)

(58) Field of Classification Search
CPC ........ B60S 1/38; B60S 1/3889; B60S 1/3881; B60S 1/3879; B60S 1/3894
See application file for complete search history.

(56) References Cited

U.S. PATENT DOCUMENTS

2010/0050362 A1    3/2010  Boland
2013/0067676 A1*   3/2013  Yoshimoto ............ B60S 1/3889
                                                15/250.32

(Continued)

FOREIGN PATENT DOCUMENTS

DE    102008001152 A1    10/2009
EP        3009311 A1     4/2016
FR        2973314 A1    10/2012

OTHER PUBLICATIONS

International Search Report and Written Opinion in corresponding International Application No. PCT/EP2018/057830, dated Jun. 5, 2018 (10 pages).

*Primary Examiner* — Michael D Jennings
(74) *Attorney, Agent, or Firm* — Osha Bergman Watanabe & Burton LLP

(57) ABSTRACT

The invention relates to an assembly (5, 8) formed of an end-piece (8) and a wiper rubber (5) which constitute a wiper blade (1), the wiper rubber (5) comprising at least one heel (5a) and a friction zone (5g), the friction zone (5g) being capable of coming into contact with a surface to be wiped, the end-piece (8) comprising a first receiver (21) which is configured to receive a first end (31) of a flexible support (6) of the wiper blade (1), and a second receiver (22) into which the heel (5a) of the wiper rubber (5) extends, the two receivers (21, 22) being superposed in a plane passing through the heel (5a) and through the friction zone (5g), the end-piece (8) comprising a means of attachment (19) to the wiper rubber (5) integrally formed with the end-piece (8).

14 Claims, 7 Drawing Sheets

(56) References Cited

U.S. PATENT DOCUMENTS

Figure 1:
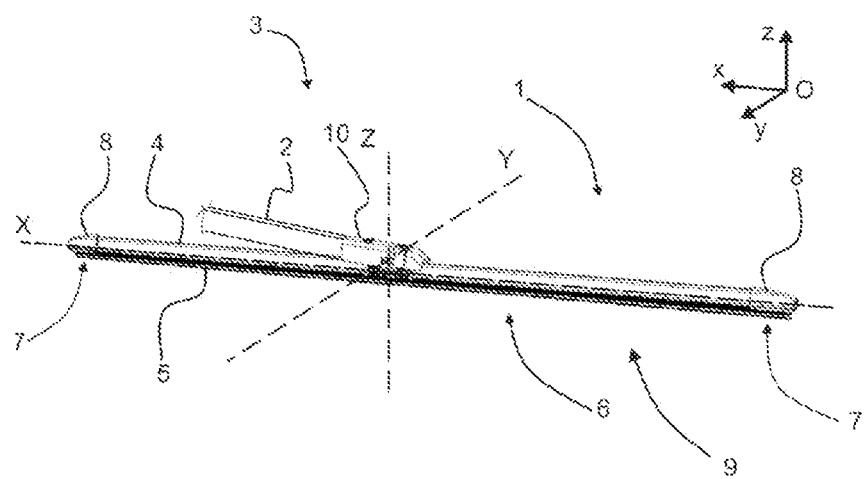

2016/0001745 A1\* 1/2016 Yoshimoto ............ B60S 1/3867
15/250.38
2016/0016550 A1\* 1/2016 Depondt ............... B60S 1/3887
15/250.38

\* cited by examiner

END PIECE AND WIPER RUBBER OF A WIPER BLADE

The field of the present invention is that of wiping systems for equipping a motor vehicle. It relates to an assembly formed of an end-piece and a wiper rubber which constitute a wiper blade.

A wiping system, commonly called a windscreen wiper, for a motor vehicle is designed to remove, by sweeping, liquids and dirt which can interfere with the view that a driver of the motor vehicle has of his surroundings. Such windscreen wipers generally comprise a driving arm which performs an angular to-and-fro movement about an axis of rotation, and an elongate wiper blade equipped with a wiper rubber made of a resilient material. By rubbing against a glazed surface, front or rear, of the motor vehicle, the wiper rubber sweeps the water and a certain amount of dirt from the glazed surface and removes it from the driver's field of vision.

Whatever the configuration of the wiper blade, that is to say either a wiper blade comprising articulated clamps which hold the wiper rubber in a plurality of separate regions, or a wiper blade comprising at least one flexible support which holds the wiper rubber over its entire length, otherwise called a "flat blade", the wiper blade is attached to a terminal portion of the driving arm by way of a connection device which comprises a connector mounted integrally with the wiper blade.

At each of the longitudinal ends of the wiper blade in its "flat blade" variant, the wiper rubber and the flexible support are equipped with an end-piece which contributes towards holding the wiper blade and the flexible support firmly together.

The closest prior art is formed by document US2010/0050362, wherein the end-piece is capable of receiving the longitudinal ends of two carrying elements and the longitudinal end of the wiper rubber. To that end, the end-piece comprises a first receiver and a second receiver which are arranged in the same first plane and are capable of each receiving a longitudinal end of one of the carrying elements. The end-piece has a third receiver which is capable of receiving the longitudinal end of the wiper rubber, the third receiver being interposed between the first receiver and the second receiver, the third receiver communicating with the first receiver and the second receiver.

The end-piece also has a pair of teeth arranged in the same second plane. A first tooth is placed beneath the first receiver and a second tooth is placed beneath the second receiver. The teeth form a means of holding the end-piece, on the basis of the penetration of the teeth into the wiper rubber, in order to hold the wiper rubber and the end-piece in position.

Such a holding means is particularly aggressive towards the wiper rubber and tends to cause tearing thereof, and ultimately damage to the wiper blade.

In addition, the technology with two carrying elements employed by the wiper blade disclosed in that document is not suitable at all for the case where the user wishes to replace only the worn part of his wiper blade, that is to say the wiper rubber. Indeed, the end-pieces are involved in mechanically holding the two carrying elements, and the dismantling thereof, in order to replace the wiper rubber, requires the carrying elements to be moved apart in a manner which is incompatible with the ergonomic re-fitting of a new wiper rubber.

An object of the present invention is to propose an assembly formed of an end-piece and a wiper rubber, the end-piece being provided with a means of attachment to the wiper rubber, such an assembly allowing the wiper rubber to be replaced easily when it is worn, without having to separate the wiper blade into a multiplicity of parts.

Accordingly, the present invention provides an assembly formed of an end-piece and a wiper rubber constituting a wiper blade, the wiper rubber comprising at least one heel and a friction zone, the friction zone being capable of coming into contact with a surface to be wiped, the end-piece comprising a first receiver which is configured to receive a first end of a flexible support of the wiper blade, and a second receiver into which the heel of the wiper rubber extends, the two receivers being superposed in a plane which passes through the heel and through the friction zone, the end-piece comprising a means of attachment to the wiper rubber which is integrally formed with the end-piece.

The material constituting the end-piece is used to generate a frictional connection with the wiper rubber, especially in a portion of the wiper rubber that is situated between the heel and the friction zone of the wiper rubber. The means of attachment will therefore squeeze the wiping blade so as to ensure a mechanical connection by friction between the end-piece and the wiper rubber.

The friction zone forms a longitudinally extending band which comes into contact with the surface to be wiped, it being possible for the surface to be wiped to be a windscreen, a rear window or a headlamp of a vehicle.

The receivers are recesses formed in the end-piece which have a rectangular, or generally rectangular, cross-section.

Although suitable for an original equipment wiper blade on a motor vehicle, the assembly according to the invention forms an article sold in the sales networks for aftermarket parts for motor vehicles.

The assembly according to the invention advantageously comprises at least one of the following features, taken alone or in combination:

- the means of attachment comprises a channel formed through a peripheral wall of the end-piece, the channel comprising a first portion of a first width and a second portion of a second width, the second width being greater than the first width. Advantageously, the second portion is a continuation of the first portion in the plane mentioned above, and, for example, one is the immediate continuation of the other,
- the wiper rubber comprises an intermediate body arranged between the heel and the friction zone, the intermediate body has a thickness greater than the first width of the first portion of the channel and smaller than the second width of the second portion of the channel, measured before insertion into the channel. The wiper rubber is made of a deformable material, for example of elastomer or of rubber. It is therefore capable of being compressed in order to enter the first portion of the channel,
- the channel comprises a third portion of a third width which is greater than the first width. The third portion is a zone of insertion of the wiper rubber, which allows the wiper rubber to be mounted on the end-piece. Advantageously, the third portion is a continuation of the first portion in the plane mentioned above, and, for example, one is the immediate continuation of the other. It will be noted that the first portion is interposed between the second portion and the third portion of the channel,
- the end-piece comprises a first neck of a fourth width which is interposed between the first portion and the second portion, the fourth width being smaller than the first width. Such a neck thus forms a restriction of the width of the first portion of the channel into which the wiper rubber extends, the first neck is equipped with at least one tooth. Advantageously, the neck comprises a single pair of teeth, that is to say two teeth situated one facing the other. The teeth are integrally formed with the end-piece and are formed by a thickness of the peripheral wall which delimits the end-piece. Each of the teeth extends towards the second portion of the channel, the first receiver is separated from the second receiver by a wall common to both receivers. Such a common wall can be solid and uninterrupted between the two receivers. According to an alternative, the common wall can comprise a passage between the two receivers, the receivers remaining separate as long as at least one common wall portion exists between the first receiver and the second receiver, the third width decreases between a first opening of the channel and a second neck which is interposed between the first portion and the third portion of the channel, the third width decreases continuously or in steps, a width of an intermediate body of the wiper rubber, measured outside the first portion of the channel, is greater than the first width of the first portion of the channel, only the wiper rubber is deformable. In other words, the end-piece is not itself deformable, the end-piece is made of a material which is more rigid than the material of which the wiper rubber is made, the peripheral wall of the end-piece in which the channel is formed has a planar surface over a dimension at least equivalent to a width of the first receiver of the end-piece which is to receive the first end of the flexible support.

The end-piece described in the present invention is monolithic, that is to say formed in a single piece and of a single material.

The invention relates also to a wiper blade comprising such an assembly and a flexible support, the first end of which is received inside the first receiver. Such a wiper blade can especially also comprise one or more air deflectors, a connector and optionally an adapter allowing the wiper blade to be associated with a particular type of driving arm.

The invention relates also to a wiping system comprising a driving arm provided with a connection device for connection to such a wiper blade, it being possible for the connection device to comprise an adapter as described above.

Figure 2:
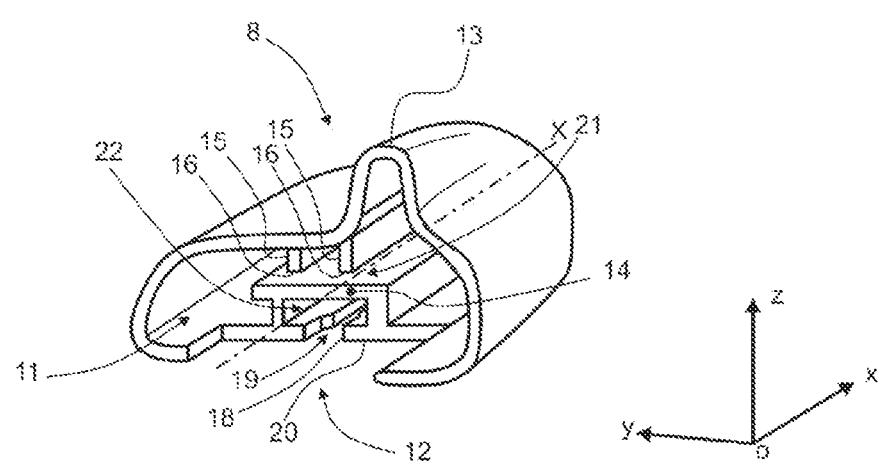
Figure 3:
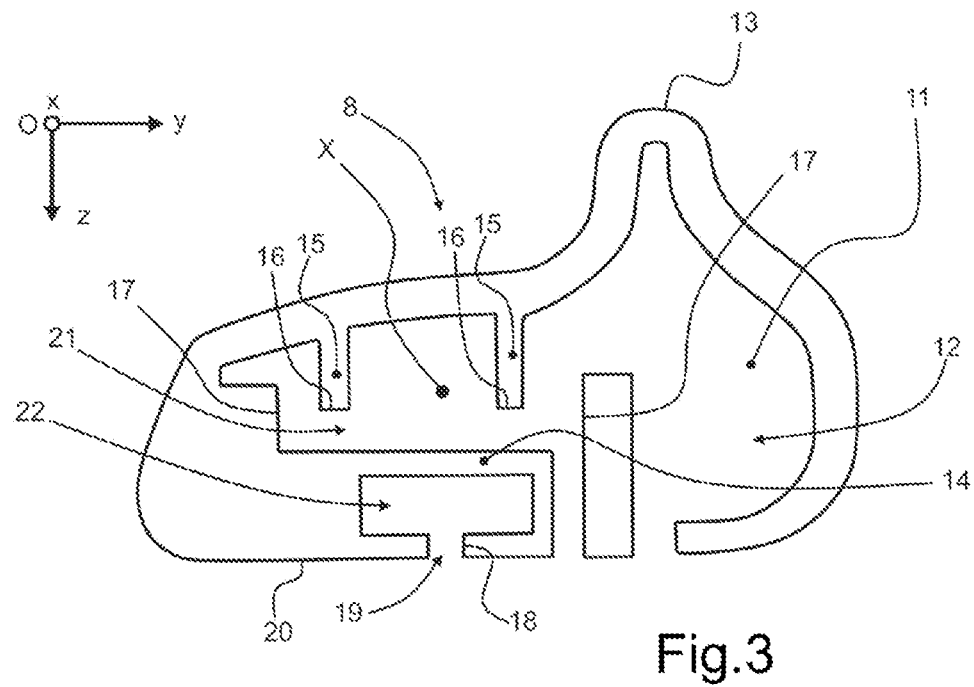
Figure 4:
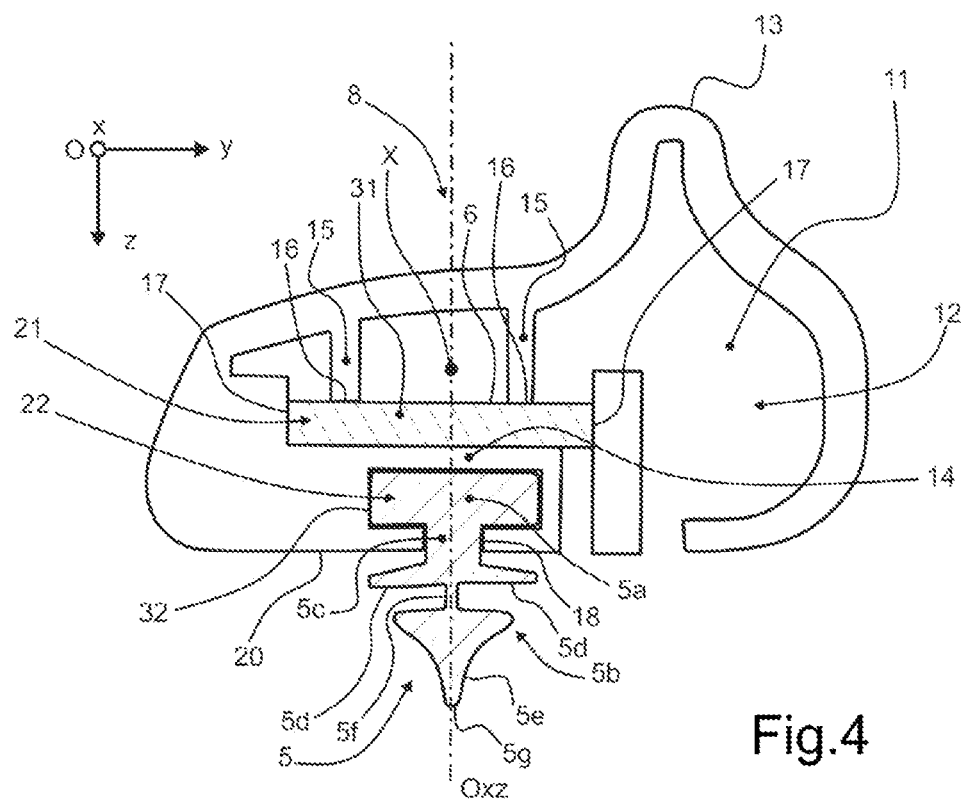
Figure 5:
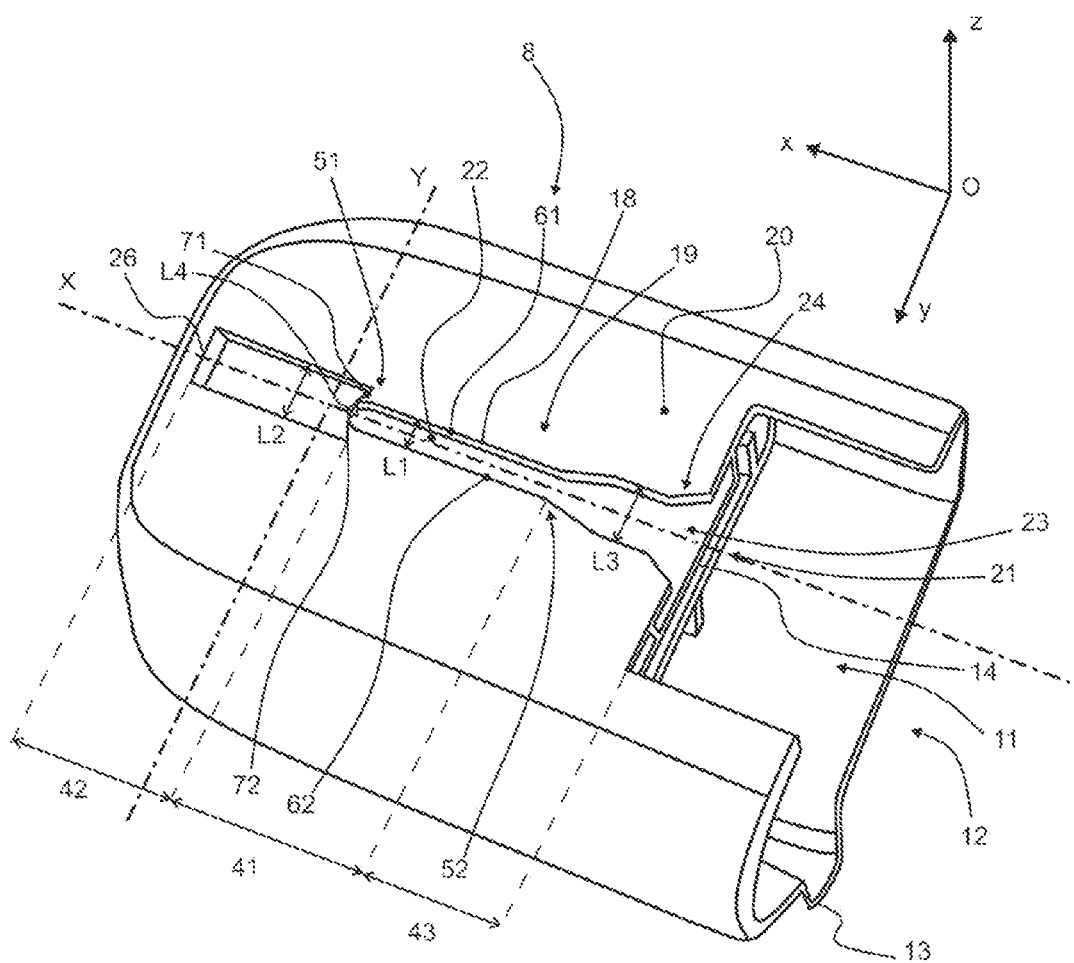
Figure 6:
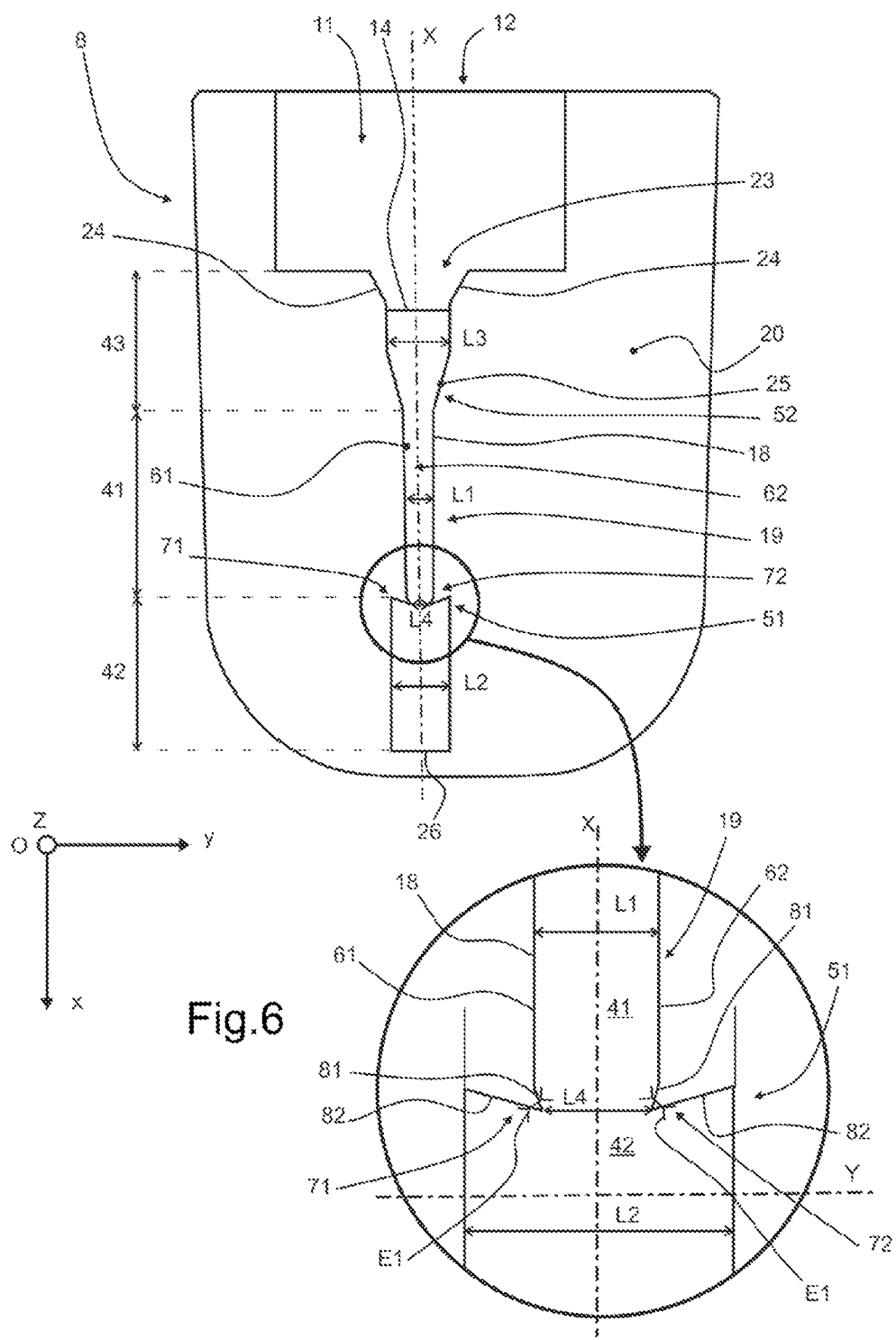
Figure 7:
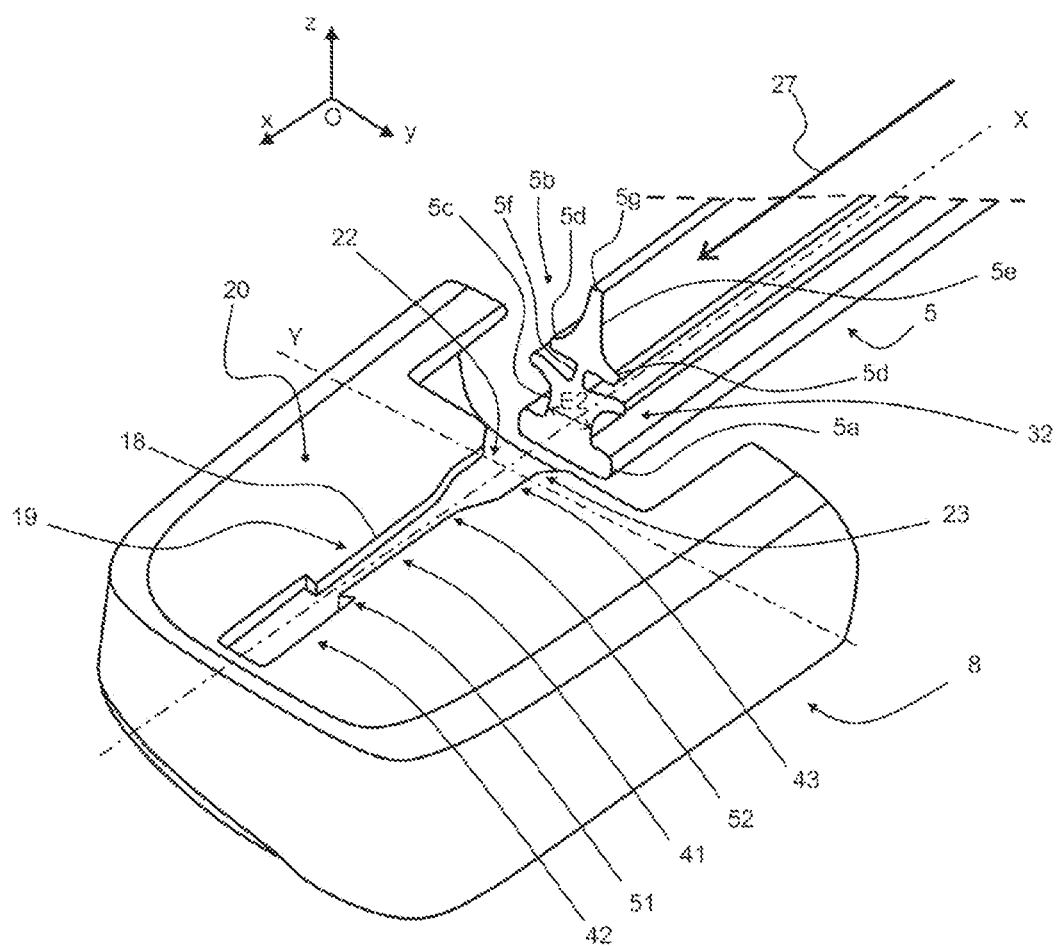
Figure 8:
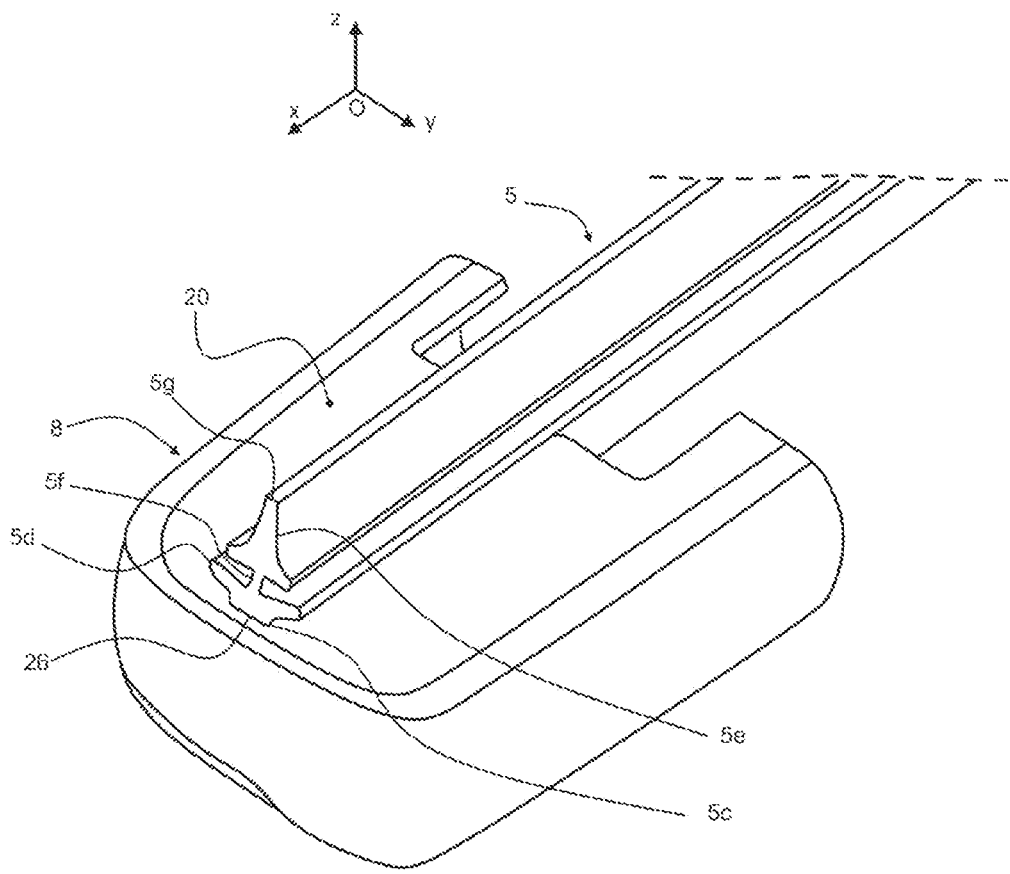

Other features, details and advantages of the invention will become more clearly apparent upon reading the description given below by way of illustration in relation to drawings in which:

FIG. 1 is a perspective view of a wiping system according to the invention,

FIG. 2 is a perspective side view of an end-piece forming part of the wiping system shown in FIG. 1, FIG. 3 is a transverse sectional view of the end-piece shown in FIG. 2, FIG. 4 is a transverse sectional view of the end-piece shown in FIGS. 2 and 3 associated with a wiper rubber and a flexible support, FIG. 5 is a perspective bottom view of the end-piece shown in FIGS. 2 to 4, FIG. 6 is a bottom view of the end-piece shown in FIGS. 2 to 5, FIG. 7 is a perspective bottom view of the end-piece shown in FIGS. 2 to 6 and of the wiper rubber prior to their assembly, FIG. 8 is a perspective bottom view of the end-piece and of the wiper rubber shown in FIG. 7 assembled with one another.

It should first be noted that the figures explain the invention in a detailed manner in order to carry out the invention, it of course being possible for the figures to serve to better define the invention, where appropriate.

In the figures, the terms longitudinal, transverse, vertical, lateral, left, right, upper, lower refer to the orientation, in an orthonormal reference system Oxyz, of a wiper blade 1 shown in FIG. 1. In this reference system, the axis Ox represents the longitudinal direction, the axis Oy represents the transverse direction and the axis Oz represents the vertical direction of the object in question, especially the wiper blade. In this reference system, a longitudinal plane is parallel to the plane Oxz, a transverse plane is parallel to the plane Oyz and a vertical plane is parallel to a plane Oxy.

In FIG. 1, a wiper blade 1 according to the present invention extends along a longitudinal axis X, parallel to the axis Ox. The terms left and right are to be understood in relation to a position along a transverse axis Y, parallel to the axis Oy, on either side of the longitudinal axis X. A vertical axis Z symbolizes a vertical direction, parallel to that of the axis Oz, which is perpendicular to the longitudinal and transverse directions described above. The terms upper or lower relate to orientations along the vertical axis Z, the term lower containing the plane of the windscreen. For the longitudinal directions, the terms outer or inner are to be understood relative to a pivot point of the wiper blade 1 on a driving arm 2 of the wiper blade 1, the term inner corresponding to the part where the driving arm 2 and one half-blade extend, the term outer corresponding to the part where the other half-blade extends.

A motor vehicle is commonly equipped with a wiping system 3 for removing water and/or dirt present on a glazed surface, especially a rear window or a front windscreen of the motor vehicle. The wiping system 3 comprises the driving arm 2, which is capable of performing an angular to-and-fro movement along and above the glazed surface.

The wiping system 3 also comprises the wiper blade 1, which extends along the longitudinal axis X. The wiper blade 1 comprises a wiper rubber 5 and at least one air deflector 4. The air deflector 4 is provided to convert a pressure applied by a flow of air flowing along the glazed surface into a force which presses the wiper blade 1 against the glazed surface of the motor vehicle.

The wiper rubber 5 is the part of the wiper blade 1 that is in direct contact with the glazed surface in order to remove the water and/or dirt present thereon. The wiper rubber 5 is, for example, a flexible blade made of a resilient material, such as a polymer, especially rubber. The wiper blade 1 also comprises a flexible support 6, which is visible more particularly in FIG. 4, which confers on the wiper blade 1 a certain deformation in the plane Oxz and a curved shape for optimized application of the wiper blade 1 against the glazed surface. The wiper blade 1 also comprises at each of its longitudinal ends 7 an end-piece 8. Each end-piece 8 is provided to hold the wiper rubber 5 and the flexible support 6 together, it being possible for such an end-piece 8, for example, to cover a terminal portion of the air deflector 4. The flexible support 6 therefore extends from a first longitudinal end 7 of the wiper blade 1 to a second longitudinal end 7 of the same blade.

According to the exemplary embodiment, the flexible support 6 is, for example, a metal strip, otherwise called a vertebra. Advantageously, there is only one such vertebra, at least when seen in the plane Oxy.

The air deflector 4, the wiper rubber 5 and the flexible support 6 form a semi-rigid structure 9 which is carried by a connection device 10, interposed between a terminal portion of the driving arm 2 and the semi-rigid structure 9. Such a connection device 10 comprises, for example, a connector secured at least in an isostatic manner to the semi-rigid structure 9, and an adapter connected by a pivot link to the connector.

In FIGS. 2 to 4, the end-piece 8 is generally arranged in a cap which delimits an internal volume 11 accessible by way of a passage 12. The passage 12 extends preferably inside a transverse plane Oyz. The end-piece 8 comprises an upper ridge 13 which is provided to receive a longitudinal end of a leading edge of the air deflector 4. The upper ridge 13 extends generally in a vertical plane Oxz.

According to the invention, an assembly is formed of the end-piece 8 and the wiper rubber 5, attached to one another by a means of attachment 19 which is formed integrally with the end-piece 8. It will be appreciated here that the means of attachment is one or more forms of the end-piece 8 which are capable of forming an at least isostatic connection between the end-piece 8 and the wiper rubber 5. According to one example, such a means of attachment 19 clamps the wiper rubber 5.

The end-piece 8 has at least two separate receivers 21, 22, of which a first receiver 21 is provided to receive a longitudinal end 31 of the flexible support 6 and of which a second receiver 22 is provided to receive in part a longitudinal end 32 of the wiper rubber 5. The first receiver 21 and the second receiver 22 are sealed with respect to one another and do not communicate with one another. The first receiver 21 and the second receiver 22 are both formed in a horizontal plane Oxy, extending along the longitudinal axis X.

The first receiver 21 and the second receiver 22 are superposed one on top of the other, the first receiver 21 being placed above the second receiver 22, in the use position of the wiper blade 1 on the motor vehicle. In this configuration, the first receiver 21 is a lower receiver and the second receiver 22 is an upper receiver. The first receiver 21 and the second receiver 22 open to the exterior of the end-piece 8 by way of the passage 12. Such a passage 12 gives access to the first receiver 21 for the longitudinal end 31 of the flexible support 6 and to the second receiver 22 for the longitudinal end 32 of the wiper rubber 5.

Referring more particularly to FIG. 4, the wiper rubber 5 comprises a heel 5a and a head 5b which are connected to one another by an intermediate body 5c. The second receiver 22 is intended more particularly to receive the heel 5a of the wiper rubber 5 so as to allow the head 5b of the wiper rubber 5 to protrude from the end-piece 8. The heel 5a has, for example, a cross-section which is complementary to the cross-section of the second receiver 22. The cross-section of the heel 5a is here generally rectangular in order to facilitate insertion of the heel 5a into the second receiver 22, which is likewise of rectangular cross-section.

The head 5b comprises, for example, lateral arms 5d, which are carried by the intermediate body 5c, and a tapered point 5e connected to the lateral arms 5d by way of a transition portion 5f. The tapered point 5e of the wiper rubber 5 is provided to travel along the glazed surface, a friction zone 5g of the tapered point 5e coming into contact with the glazed surface when the wiper blade 1 is positioned on the glazed surface. The friction zone 5g on the one hand and the heel 5a on the other hand each form an end of the wiper rubber 5, when seen in a plane Oxz. This plane, which passes through the friction zone 5g and through the heel 5a, forms a longitudinal mid-plane which divides the wiper rubber 5 symmetrically, as is visible in FIG. 4.

The first receiver 21 and the second receiver 22 are preferably delimited by at least one common wall 14 which forms part of the end-piece 8. This wall is common in the sense that it delimits the two receivers 21 and 22. The common wall 14 extends inside a horizontal plane Oxy between the first receiver 21 and the second receiver 22.

The first receiver 21 is also delimited by at least one post 15, and preferably two posts 15, as shown in FIGS. 2 to 4. The posts 15 are parallel to one another and parallel to a plane Oxz. The posts 15 each comprise a lower end which forms a guide ramp 16 formed parallel to a plane Oxy. In other words, the first receiver 21 is bordered by the guide ramps 16 and by the common wall 14, so that the flexible support 6 is inserted into the first receiver 21 by sliding between the common wall 14 and the guide ramps 16, and against those ramps. Lateral edges 17 of the end-piece 8 allow the flexible support 6 to be guided inside the plane Oxy. The common wall 14, the posts 15 and the lateral edges 17 delimit peripherally at least one portion of the first receiver 21. That periphery is nevertheless open, for example between the two posts 15, or between each post 15 and each lateral edge 17.

The second receiver 22 is equipped with a channel 18. The channel 18 forms an exemplary embodiment of the means of attachment 19 which the end-piece 8 comprises for attaching and holding the wiper rubber 5.

The channel 18 opens towards the outside of the end-piece 8 and is formed extending parallel to the longitudinal axis X. The channel 18 permits communication between the second receiver 22 and the outside of the end-piece 8. The channel 18 is in the form of a slot formed through a lower wall 20 of the end-piece 8. As is shown especially in FIG. 5, the lower wall 20 of the end-piece 8 is planar. More precisely, the lower wall 20 of the end-piece 8 is planar over a dimension at least equivalent to a width of the first receiver 21 for receiving the first longitudinal end 31 of the flexible support 6. That width of the first receiver 21 is measured along the transverse axis Y, between the lateral edges 17.

The channel 18 receives at least in part the intermediate body 5c of the wiper rubber 5, while the second receiver 22 receives the heel 5a of the wiper rubber, the head 5b being maintained outside the end-piece 8.

On either side of the channel 18, the lower wall 20 which delimits the second receiver 22 forms two hooks which trap the heel 5a of the wiper rubber 5 and hold it in the second receiver 22.

In a plane Oxy, the channel 18 is delimited by an opening 23 which is formed through the lower wall 20 and which permits communication between the channel 18 and the passage 12. That opening 23 is the one through which the intermediate body 5c enters the means of attachment 19 when the wiper rubber 5 is secured to the end-piece 8.

In FIGS. 5 and 6, the channel 18 comprises three portions 41, 42, 43, a first portion 41 of which is interposed between a second portion 42 and a third portion 43, the third portion 43 being bordered by the first opening 23. In other words, from the first opening 23, the channel 18 comprises, in succession and along the longitudinal axis X, the third portion 43, the first portion 41 and the second portion 42, the first opening 23 being longitudinally opposite and situated facing a stop 26 which delimits in part the second portion 42.

The stop 26 is formed by a peripheral wall which delimits the end-piece 8 relative to its exterior environment.

The portions 41, 42, 43 have respective widths L1, L2, L3 which are different from one another, each width L1, L2, L3 being measured parallel to the transverse axis Y between two longitudinal edges 61, 62 which are transversely opposite one another and face one another. The longitudinal edges 61, 62 therefore delimit the channel 18 transversely. More particularly, the first width L1 is strictly smaller than the second width L2. Yet more particularly, the first width L1 is strictly smaller than the third width L3.

The first portion 41 and the second portion 42 are separated from one another by a first neck 51. In other words, the first neck 51 is the zone of the channel 18 where the width of the channel 18 changes from the first width L1 to the second width L2. The first neck 51 has a fourth width L4, taken between the longitudinal edges 61, 62 and parallel to the transverse axis Y, which is preferably smaller than the first width L1, so that the first neck 51 forms a width restriction interposed between the first portion 41 and the second portion 42.

The first neck 51 is equipped with a single pair of teeth 71, 72, a first tooth 71 equipping a first longitudinal edge 61 and a second tooth 72 equipping a second longitudinal edge 62. Each tooth 71, 72 is in the shape of a harpoon, one end of which points towards the second portion 42. In other words, the teeth 71, 72 point inwards and are tapered from the first portion 41 towards the second portion 42. A width E1 of each tooth 71, 72, measured parallel to the transverse axis Y, between two longitudinal edges 81, 82 which delimit the tooth 71, 72, decreases from the first portion 41 to the second portion 42. Each tooth 71, 72 is, for example, of triangular shape.

The first portion 41 and the third portion 43 are separated from one another by a second neck 52. In other words, the second neck 52 is the zone of the channel 18 where the width of the channel 18 changes from the first width L1 to the third width L3. The third portion 43 is a zone in which the longitudinal edges 61, 62 may comprise one or more chamfers 24 so that the third width L3 preferably decreases from the first opening 23 to the second neck 52, the decrease being either regular and continuous or in steps. According to both of these variants, the third portion 43 is generally arranged as a funnel.

FIGS. 7 and 8 show two successive steps of a method for attaching the wiper rubber 5 to the end-piece 8. In FIG. 7, the intermediate body 5c of the wiper rubber 5 is placed facing the first opening 23, and the heel 5a of the wiper rubber 5 is placed facing the second receiver 22. On the basis of a movement in translation, illustrated by an arrow denoted 27, of the wiper rubber 5 along the longitudinal axis X, the second longitudinal end 32 of the wiper rubber 5 passes through the passage 12 until the heel 5a enters the second receiver 22 and the intermediate body 5c enters the third portion 43 of the channel 18.

The arrangement of the third portion 43 as a funnel facilitates the insertion of the intermediate body 5c into the channel 18, and consequently facilitates the introduction of the heel 5a into the second receiver 22. The intermediate body 5c of the wiper rubber 5 then travels inside the first portion 41 while being laterally compressed. The intermediate body 5c is of a width E2 which is greater than the first width L1, the width E2 of the intermediate body 5c being measured parallel to the transverse axis Y between two lateral edges of the intermediate body 5c before the wiper rubber 5 is attached to the end-piece 8. In another reference system, the width E2 of the intermediate body 5c can be measured outside the first portion 41 of the channel 18, for example in the third portion 43 or outside the end-piece 8.

It will be appreciated here that the insertion of the intermediate body 5c into the first portion 41 is carried out by force on the basis of a resilient deformation of the intermediate body 5c. These provisions aim to strengthen a mechanical connection of the end-piece 8 with the wiper rubber 5. The intermediate body 5c then passes the first neck 51, the arrangement of which as a width restriction generates additional squeezing of the intermediate body 5c inside the channel 18 in the region of the first neck 51. These provisions also aim to improve the mechanical connection between the end-piece and the wiper rubber 5, by limiting any translational movement in an opposite direction to that illustrated by the arrow 27.

The intermediate body 5c is then introduced into the second portion 42, inside which the intermediate body 5c is deployed and spreads laterally, regaining its initial width. Finally, the second end 32 of the wiper rubber 5 comes into contact with the stop 26, thus limiting the translational movement according to the arrow 27. So positioned in the second portion 42 of the channel 18, the intermediate body 5c tends to regain its initial shape and the teeth 71, 72 are anchored inside the intermediate body 5c so that the intermediate body, and consequently the wiper rubber 5, is held firmly in place, as shown in FIG. 8. These provisions optimize a mechanical connection between the end-piece 8 and the wiper rubber 5.

It will be appreciated from the above that only the wiper rubber 5 deforms during the method of attaching the wiper rubber 5 to the end-piece 8. In other words, the end-piece 8 is made of a material which is more rigid than the material of which the wiper rubber 5 is made.

It will be noted at this point of the description that a length of the channel 18, measured parallel to the longitudinal axis X between the first neck 51 and the second neck 52, that is to say forming the first portion 41, is between 7.5 mm and 11.5 mm, to within +/−10%, so that the objective of frictional connection and attachment of the end-piece 8 to the wiper rubber 5 is optimized. Such a length offers the necessary frictional connection between the means of attachment 19 of the end-piece 8 and the wiper rubber 5. An optimized length of the first portion 41 is equal to 8 mm.

The preceding description clearly explains how the invention makes it possible to achieve the objectives it has set, and especially to propose an assembly comprising an end-piece and a wiper rubber of a wiper blade for a motor vehicle which are mechanically connected to one another by a means formed integrally with the end-piece, that is to say without the addition of an additional clip.

Of course, various modifications can be made by the person skilled in the art to the assembly according to the invention which has just been described by way of non-limiting example, when there is employed a form of the end-piece moulded simultaneously with the remainder of the end-piece.

In any case, the invention is not limited to the embodiment specifically described in this document and extends in particular to any equivalent means and to any technically effective combination of those means.

The invention claimed is:

1. An assembly formed of:
an end-piece; and
a wiper rubber constituting a wiper blade,
the wiper rubber comprising at least one heel and a friction zone, the friction zone being capable of coming into contact with a surface to be wiped, the end-piece comprising:
- a first receiver which is configured to receive a first end of a flexible support of the wiper blade,
- a second receiver into which the heel of the wiper rubber extends, the two receivers being superposed in a plane passing through the heel and through the friction zone, and
- an attachment to the wiper rubber integrally formed with the end-piece,
- wherein the attachment comprises a channel formed through a peripheral wall of the end-piece, the channel comprising a first portion of a first width and a second portion of a second width, the second width being greater than the first width.

2. The assembly according to claim 1, wherein the channel comprises a third portion of a third width which is greater than the first width.

3. The assembly according to claim 2, wherein the third width decreases between an opening of the channel and a second neck which is interposed between the first portion and the third portion.

4. The assembly according to claim 1, wherein a first neck of a fourth width is interposed between the first portion and the second portion, the fourth width being smaller than the first width.

5. The assembly according to claim 4, wherein the first neck comprises at least one tooth.

6. The assembly according to claim 4, wherein the first neck comprises a single pair of teeth.

7. The assembly according to claim 6, wherein each tooth extends towards the second portion of the channel.

8. The assembly according to claim 1, wherein a width of an intermediate body of the wiper rubber arranged between the heel and the friction zone, measured outside the first portion of the channel, is greater than the first width of the first portion of the channel.

9. The assembly according to claim 1, wherein only the wiper rubber is capable of deforming.

10. The assembly according to claim 1, wherein the end-piece is made of a material which is more rigid than the material of which the wiper rubber is made.

11. The assembly according to claim 1, wherein the peripheral wall of the end-piece in which the channel is formed has a planar surface over a dimension at least equivalent to a width of the first receiver of the end-piece which is to receive the first end of the flexible support.

12. A wiper blade comprising:
- an end-piece; and
- a wiper rubber,
- the wiper rubber comprising at least one heel and a friction zone, the friction zone being capable of coming into contact with a surface to be wiped,
- the end-piece comprising:
  - a first receiver which is configured to receive a first end of a flexible support of the wiper blade,
  - a second receiver into which the heel of the wiper rubber extends, the two receivers being superposed in a plane passing through the heel and through the friction zone, and
- an attachment to the wiper rubber integrally formed with the end-piece,
- wherein the attachment comprises a channel formed through a peripheral wall of the end-piece, the channel comprising a first portion of a first width and a second portion of a second width, the second width being greater than the first width; and
- a flexible support, the first end of which is received inside the first receiver.

13. The wiper blade according to claim 12, wherein the flexible support comprises a single vertebra.

14. A wiping system comprising: a driving arm provided with a connection device for connection to a wiper blade according to claim 12.

* * * * *